United States Patent [19]
Danfors et al.

[11] 4,219,856
[45] Aug. 26, 1980

[54] PROTECTIVE DEVICE FOR CAPACITOR BANK

[75] Inventors: Per Danfors, Ludvika; Nils Fahlen, Vesterås; Owe Nerf, Farsta, all of Sweden

[73] Assignee: ASEA Aktiebolag, Vesterås, Sweden

[21] Appl. No.: 882,689

[22] Filed: Mar. 2, 1978

[30] Foreign Application Priority Data

Mar. 11, 1977 [SE] Sweden ................................ 7702749

[51] Int. Cl.² .............................................. H02H 7/16
[52] U.S. Cl. ......................................... 361/15; 361/17; 361/111
[58] Field of Search ..................... 361/17, 16, 15, 111, 361/110, 88, 89, 72, 91, 56, 117

[56] References Cited

U.S. PATENT DOCUMENTS

| | | | |
|---|---|---|---|
| 2,942,153 | 6/1960 | Schultz et al. | 361/17 |
| 3,143,687 | 8/1964 | Hjertberg et al. | 361/16 |
| 3,158,783 | 11/1964 | Minder | 361/17 |
| 3,181,031 | 4/1965 | Yee | 361/17 |
| 3,375,341 | 3/1968 | Richards | 361/72 X |
| 3,499,165 | 3/1970 | Madzarevic et al. | 361/56 X |
| 3,909,672 | 9/1975 | Lundquist et al. | 361/17 |
| 3,935,512 | 1/1976 | Falk et al. | 361/110 |
| 4,084,204 | 4/1978 | Jacobus, Jr. | 361/72 |
| 4,090,226 | 5/1978 | Fahlen et al. | 361/89 X |

Primary Examiner—Patrick R. Salce
Attorney, Agent, or Firm—Pollock, Vande Sande & Priddy

[57] ABSTRACT

A protective device for a capacitor bank is coupled to a cross-connection between equipotential points in two sub-banks forming the bank. Current or voltage surges, indicative of a capacitor failure are counted and when a threshold level is exceeded, an alarm may be energized.

7 Claims, 6 Drawing Figures

PROTECTIVE DEVICE FOR CAPACITOR BANK

FIELD OF THE INVENTION

The present invention relates to a protective device for a capacitor bank, comprising two parallel branches, each consisting of capacitor units.

BACKGROUND OF THE INVENTION

To be able to control the condition of a capacitor bank, it is normal to provide a protecting device, for example a tripping device, which is of a so-called balance type. This balance protection for a capacitor bank, divided into two parallel branches or sub-banks, is based on a comparison of the current in or the voltage across the two branches (sub-banks). A voltage or current difference exceeding a certain level indicates that a certain number of the capacitors are damaged, for example, through a short-circuit, which causes an alarm or tripping signal from the protection means. In the case of parallel capacitors, it is normal that they are series-connected with fuses to that the fuse for a short-circuited capacitor is released.

A condition for the release of a balance protection means, of this known kind, is that the damaged capacitors are located substantially in one of the branches or sub-banks. If, on the other hand, the capacitors are destroyed equally or nearly so, in the two branches, the voltage or current difference will remain below the tripping level of the protection means. In this fashion many capacitors may become damaged in the two branches to the point that the normal voltage of the bank destroys the remaining capacitors without the protection means ever tripping.

SUMMARY OF THE INVENTION

The present invention is based on the fact that a short-circuit in a capacitor results in a current surge which is far stronger than the stationary unbalance current which remains after the short-circuit and the resultant release (or opening) of the fuse. By sensing such current surges and coupling them to a counter, as stated in the appended claims, a measure is obtained of how many capacitors are destroyed, and this measure may be used in a signal transducer for triggering an alarm or for disconnecting the whole bank. The nature of said current surges depends to a large extent on what type of capacitors are used, as will be explained.

By comparing the phase position of the current surges with the capacitor voltage, an indication may be obtained as to whether a current surge is due to a fault in one or the other of the branches. Another possibility is to combine the surge-sensing protection means and a known stationary balance protection means. Comparing the signals from these means can give an indication both of the total number of destroyed capacitors and of the distribution of these between the branches.

BRIEF DESCRIPTION OF THE DRAWINGS

In other respects, the invention will be explained in greater detail with reference to the accompanying drawings, in which.

DETAILED DESCRIPTION

Figure 1:
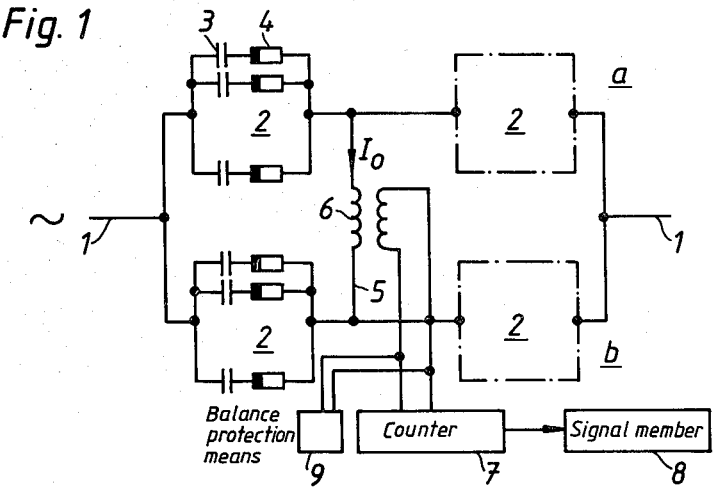
FIGS. 1-4 show different embodiments of protective means according to the invention for different types of capacitor banks; and, FIGS. 5 and 6 show two different types of capacitor units.

The capacitor bank according to FIG. 1 is inserted in an AC line 1, 1 and consists of two parallel branches 2, 2, each of which may consist of a number of parallel capacitor units 3, in series each with one fuse 4. Possibly, each branch or sub-bank may consist of several series-connected groups 2 of parallel capacitor units 3 as shown in FIG. 1.

Between two equipotential points in the two branches there is a cross-connection 5 which contains a current transformer 6, which may be an impulse transformer. The secondary side is connected to a counter 7 which may be connected to an operating member 8 with a built-in level transducer for an alarm or for release of a member, for example, for disconnection or bypass of the capacitor bank.

A short-circuit in a capacitor unit 3 in a group 2 will lead to a short-circuit current in the cross-connection 5 which, in the transformer 6, gives rise to a current surge which is sensed by the counter 7. This short-circuit current, together with the recharge current between the capacitors of the group, releases (fuses) the corresponding fuse 4.

As mentioned, the transformer 6 may also be connected to a known balance protection means 9 (e.g., according to U.S. Pat. No. 3,143,687) and by comparing the signals from 7 and 9, a measure may be obtained of the number of destroyed capacitors and the distribution of these between the two branches.

The capacitor bank shown in FIG. 1 is constructed with external fuses 4 for the individual capacitor units 3. Each capacitor unit then normally consists of a small number of series-connected capacitor elements enclosed in a case so that a short-circuit only occurs when all series-connected elements in a case are short-circuited. The short-circuit current which then arises is fed substantially from the network into which the capacitor bank is connected so that the current surge which is then sensed by transformer 6 and counter 7 has substantially mains frequency. The current in the fuse 4 contains a small high-frequency component emanating from the recharge in the unit because of the short-circuit.

Figure 5:
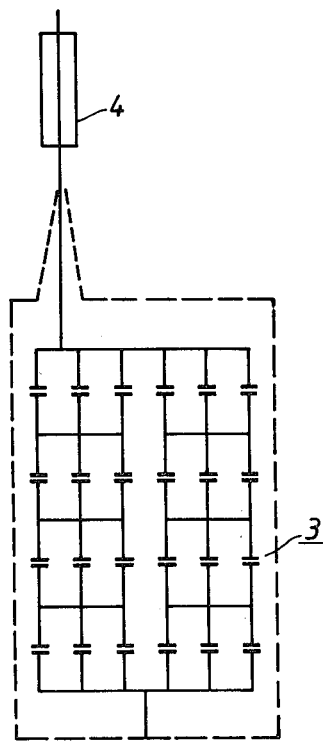

The high-frequency component mentioned is, however, of such short duration that it does not influence transformer 6 and counter 7, and hardly fuse 4 either. From FIG. 5 it will be understood that a similar brief, high-frequency current surge occurs upon each short-circuit of an element in the capacitor unit, and this current surge does not normally influence transformer 6 and counter 7 according to FIG. 1. It is the mains frequency current that is to be sensed by transformer 6 and counter 7 upon a short-circuit. This mains frequency current is of relatively long duration since its length is determined by the releasing time of the fuse, which may amount to several half cycles. Capacitor unit 3 may consist of both series- and parallel-connected elements, as shown in FIG. 5.

Figure 6:
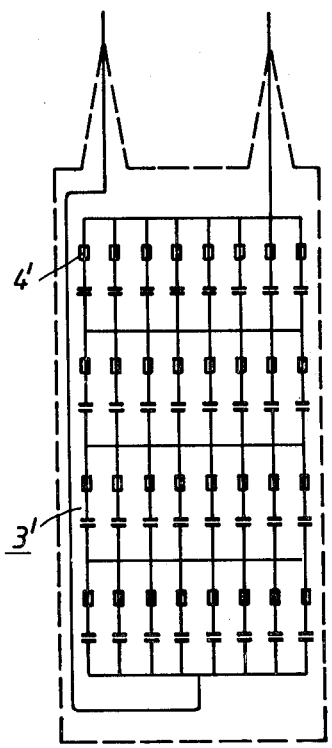

In the case of capacitor units with internal fuses (shown in FIG. 6) the conditions will be somewhat different. Such capacitor units each contain a large number of series-connected groups of parallel-connected capacitor elements, each element being series-connected with its own fuse (shown in FIG. 6). The number of elements is normally greater than in the unit of FIG. 5. Each short-circuit in an element results in fusing of a corresponding fuse 4' because of recharge within the group of parallel elements, which, in turn, results in a sudden, although limited voltage change across the capacitor units. This voltage change gives rise to a high frequency, brief current surge in the cross-connection between the two branches of the bank, which current surge is sensed through an impedance element in the cross-connection. Since the voltage or current surge is of short duration in relation to the periodic time of the mains voltage, it is possible to determine in what branch of the bank the fault has arisen by sensing the polarity or phase position of the surge in relation to the mains voltage. The device of FIGS. 2 and 3 is based on this technique.

Figure 2:
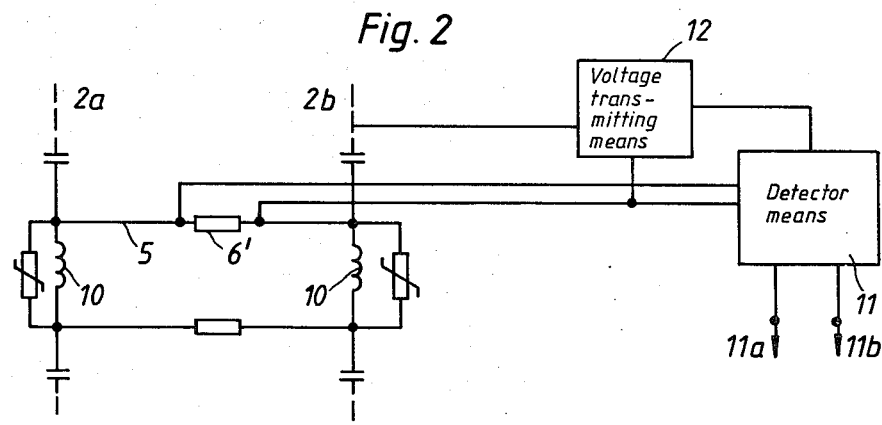

In FIG. 2, two parallel branches 2a and 2b of a capacitor bank are each connected in series with an impedance element 10, consisting of a reactor and a varistor in parallel. In this way, the capacitor bank can be divided into several stories, as is clear from FIG. 3. The cross-connection 5 comprises a resistor 6' and the voltage across this is connected to a detector 11 which senses voltage surges across resistor 6'. By means of member 12, which is connected to a part of branch 2b, a voltage can be obtained for feeding detector 11 with the required power, and for sensing the phase position of the voltage surges in relation to the capacitor voltage.

In this way it is possible to ascertain if the voltage surges across 6', caused by discharge currents between the two branches, emanate from faults in one or the other of the capacitor branches. The signals in detector 11 can then be sorted so that outputs 11a and 11b of detector 11 will indicate how many capacitors have been destroyed in each of the two branches.

Figure 3:
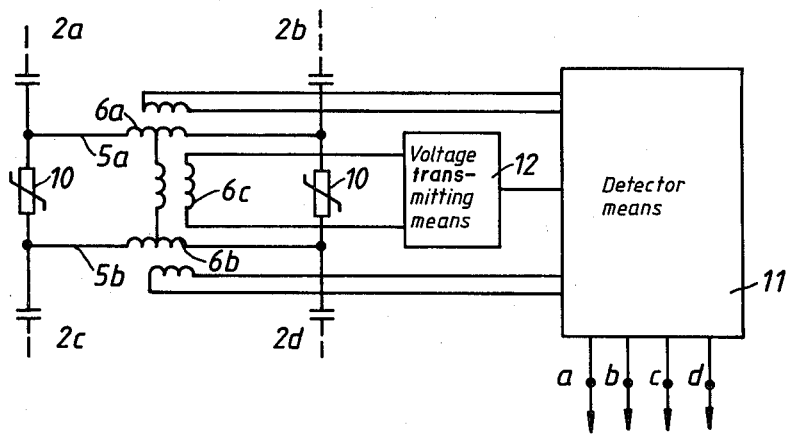

This principle is further developed in FIG. 3 which shows four parts 2a-2d of a capacitor bank like that shown in FIG. 1. The series impedances 10 here contain only varistors whereas the cross-connections 5a and 5b contain reactors 6a and 6b with secondary windings corresponding to current transformer 6 according to FIG. 1. From 6a an indication is then obtained from branch pair 2a and 2b and from 6b an indication is obtained from branch pair 2c and 2d.

A third reactor 6c is inserted between 6a and 6b for feeding member 12, connected to detector 11, for power feed and for sensing the phase position of the surges from 6a and 6b. In this way, the signals representing faults in the various capacitor branches 2a-2d can be sorted out at the outputs a-d.

The detector means 11 is simply a polarity comparing means comparing the polarity of the voltage of 12 and the voltage across 6'. As can easily be seen when studying the voltage and surge current directions upon short circuits in the one and the other branch at different polarities of the mains voltage, it is quite clear that if the voltages across 12 and 6' have the same polarity then the fault will be in the one branch, while if they have different polarity the fault will be in the other branch. Thus, for example, if the product of the two voltages (for example, obtained in a Hall generator) is positive corresponding to equal polarities, then the output from 11 could be fed out over 11a, while if the product is negative, corresponding to different polarities, the output could be fed out over 11b.

In FIG. 3 the detector 11 comprises two polarity comparing means connected to 6a and 6b, respectively, so that there are four outputs from 11.

Figure 4:
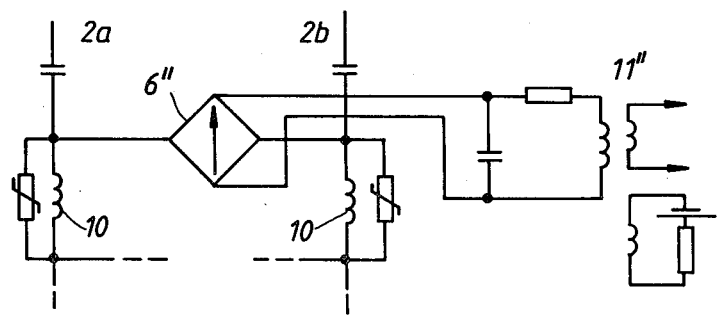

FIG. 4 shows a variance of FIG. 2, in which impedance element 6' has been replaced with a diode bridge 6''. This makes it possible to utilize all the half cycles of the high-frequency oscillation which occurs in the case of a discharge between the two capacitor branches, thus obtaining greater signal energy. Detector 11'' may be formed as a pre-magnetized transformer so that the signal can be transferred to a lower potential. Rectifier bridge 6'' can also be used in connection with the illustration of FIG. 1.

In the dimensioning of the different components according to FIGS. 2-4, due regard must be paid to the damping which occurs and which is very strong for the short current surges which will occur. The components must therefore be designed with great sensitivity. On the other hand, they must not be so sensitive that they register disturbances in the form of over-voltages from switching or atmospheric disturbances.

What is claimed is:

1. A protective device for a capacitor bank comprising two parallel capacitor sub-banks, each consisting of capacitor units, which protective device comprises at least one cross-connection means connected between equipotential points in the two sub-banks, characterized in that sensing means is connected to said cross-connection for sensing current surges in the cross-connection means resulting from one or more short-circuits in a capacitor unit, and counter means coupled to said sensing means for counting said current surges.

2. A protective device according to claim 1, characterized in that said sensing means sensing current surges consists of a transformer, with a secondary connected to said counting means.

3. A protective device according to claim 1, characterized in that the two capacitor sub-banks contain series-connected impedances connected to said cross-connection means including indicating means responsive to surge voltages.

4. Protective device according to claim 1, characterized in that said sensing means sensing current surges comprises a full wave rectifier.

5. A protective device according to claim 1, characterized in that the device also comprises stationary unbalance protection device coupled to said sensing means.

6. A protective device according to claim 1, characterized in that the device includes polarity-sensing means for distinquishing between current surges emanating from one or the other of said sub-banks.

7. A protective device according to claim 6, characterized in that said polarity-sensing means is connected to the capacitor voltage for providing power to the device.

* * * * *